(12) United States Patent
Widdifield et al.

(10) Patent No.: US 8,698,959 B2
(45) Date of Patent: Apr. 15, 2014

(54) METHOD AND APPARATUS FOR CONSTRUCTING COMPOSITE VIDEO IMAGES

(75) Inventors: Erik Widdifield, Indianapolis, IN (US); Fritz Kiffmeyer, Brownsburg, IN (US)

(73) Assignee: Thomson Licensing, Issy les Moulineaux (FR)

( * ) Notice: Subject to any disclaimer, the term of this patent is extended or adjusted under 35 U.S.C. 154(b) by 128 days.

(21) Appl. No.: 13/375,236

(22) PCT Filed: Jun. 3, 2009

(86) PCT No.: PCT/US2009/003377
§ 371 (c)(1),
(2), (4) Date: Nov. 30, 2011

(87) PCT Pub. No.: WO2010/140999
PCT Pub. Date: Dec. 9, 2010

(65) Prior Publication Data
US 2012/0075532 A1    Mar. 29, 2012

(51) Int. Cl.
*H04N 9/74* (2006.01)
*H04N 5/222* (2006.01)

(52) U.S. Cl.
USPC .................. 348/588; 348/589; 348/722

(58) Field of Classification Search
USPC ......... 348/588, 589, 584, 600, 581, 153, 159, 348/722; 715/277, 292, 800, 815, 817, 838; 725/44, 47; 345/635, 637, 630
See application file for complete search history.

(56) References Cited

U.S. PATENT DOCUMENTS

| | | | |
|---|---|---|---|
| 5,635,978 A * | 6/1997 | Alten et al. ................ 725/42 |
| 6,396,941 B1 * | 5/2002 | Bacus et al. ............... 382/128 |
| 6,968,566 B1 * | 11/2005 | Entwistle ................... 725/39 |
| 7,006,099 B2 * | 2/2006 | Gut et al. .................. 345/557 |
| 7,844,987 B2 * | 11/2010 | Kelts ......................... 725/44 |
| 7,873,972 B2 * | 1/2011 | Zaslavsky et al. ......... 725/41 |
| 8,402,488 B2 * | 3/2013 | Craner ....................... 725/45 |
| 2002/0078440 A1 | 6/2002 | Feinberg et al. |
| 2002/0138834 A1 * | 9/2002 | Gerba et al. ............... 725/42 |
| 2004/0055007 A1 * | 3/2004 | Allport ...................... 725/39 |
| 2004/0184548 A1 * | 9/2004 | Kerbiriou et al. ......... 375/240.28 |
| 2005/0013642 A1 | 1/2005 | Kawamoto |
| 2005/0253966 A1 * | 11/2005 | Mertens ..................... 348/553 |
| 2006/0282852 A1 | 12/2006 | Purpura et al. |
| 2007/0201749 A1 | 8/2007 | Yamauchi et al. |

FOREIGN PATENT DOCUMENTS

| | | |
|---|---|---|
| EP | 1883231 | 1/2008 |
| JP | 06164891 | 6/1994 |
| JP | 2004328577 | 11/2004 |
| WO | WO2004004322 | 1/2004 |
| WO | WO2006082979 | 8/2006 |
| WO | WO2008073505 | 6/2008 |

OTHER PUBLICATIONS

Search Report dated Jul. 28, 2009.

* cited by examiner

*Primary Examiner* — Victor Kostak
(74) *Attorney, Agent, or Firm* — Robert D. Shedd; Reitseng Lin

(57) ABSTRACT

A method renders video apparatus testing more efficient by consolidating important information from many video images into one or more composite video images. According to an exemplary embodiment, the method includes steps of receiving location information for portions of first and second video images, and combining the portions of the first and second video images into a third video image for display.

8 Claims, 4 Drawing Sheets

|  400 | 401 | 402 | | | | 403 |
|---|---|---|---|---|---|---|
| 000 | 001 | 002 | • | • | • | 039 |
| 040 | 041 | 042 | • | • | • | 079 |
| 080 | 081 | 082 | • | • | • | 119 |
| 120 | 121 | 122 | • | • | • | 159 |
| 160 | 161 | 162 | • | • | • | 199 |

| 000 | 003 | 005 | 007 | 009 | 020 | 031 | 041 | 050 | 053 | 055 | 056 |
|-----|-----|-----|-----|-----|-----|-----|-----|-----|-----|-----|-----|
| 001 || 004 || 008 || 010 || 011 || 012 ||
| 002 |||| 006 |||| 013 ||||
| 014 |||| 021 |||| 032 ||||
| ⋮ ||||||||||||

*FIG.5*

METHOD AND APPARATUS FOR CONSTRUCTING COMPOSITE VIDEO IMAGES

This application claims the benefit, under 35 U.S.C. §365 of International Application PCT/US2009/003377, filed Jun. 3, 2009, which was published in accordance with PCT Article 21(2) on Dec. 9, 2010 in English.

BACKGROUND OF THE INVENTION

1. Field of the Invention

The present invention generally relates to video images, and more particularly, to a method that renders video apparatus testing more efficient by consolidating important information from many video images into one or more composite video images.

2. Background Information

The testing of video apparatuses/devices/systems (e.g., televisions, set-top boxes, etc.) is an important aspect of quality control to ensure that such apparatuses/devices/systems are operating and producing video images in accordance with their prescribed design specifications. One example of such testing is a test to confirm that for each channel (e.g., 000 through 999), a banner containing the correct channel number is properly displayed. One method that is currently used for this test includes capturing 1000 images corresponding to each of the 1000 channels, and storing the 1000 images for later review.

If these 1000 stored images are reviewed, for example, in an automatic evaluation test mode (e.g., via computer) and the test fails, or if the test is not run in an automatic evaluation test mode, a tester must manually review each of the 1000 images, find the location of the channel number in the banner, and identify that the correct channel number is displayed. This method, however, is less than optimal since it tends to consume a lot of time and a lot of storage space. As a result, testers using this method may spend many man-hours having to review a large number of images, which also contain lots of data irrelevant to the test. Many man-hours have also been wasted by testers reporting errors in the irrelevant data set.

Accordingly, there is a need to address the aforementioned problem and thereby provide a method for testing the operation of video apparatuses/devices/systems in a more efficient and less time-consuming manner. The present invention addresses these and/or other issues.

SUMMARY OF THE INVENTION

In accordance with an aspect of the present invention, a method is disclosed. According to an exemplary embodiment, the method comprises receiving location information for portions of first and second video images, and combining the portions of the first and second video images into a third video image for display.

In accordance with another aspect of the present invention, a video apparatus is disclosed. According to an exemplary embodiment, the video apparatus comprises means such as a processor for receiving location information for portions of first and second video images and combining the portions of the first and second video images into a third video image, and means such as a memory for storing the third video image.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 4 is a diagram illustrating a composite video image according to an exemplary embodiment of the present invention; and FIG. 5 is a diagram illustrating another composite video image according to an exemplary embodiment of the present invention.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
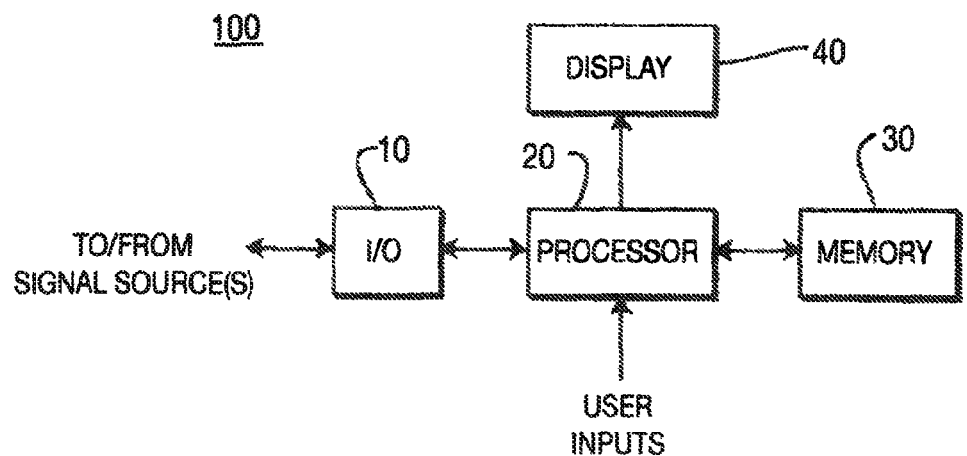
FIG. 1 is a block diagram of a relevant portion of a video apparatus according to an exemplary embodiment of the present invention.

Referring now to the drawings, and more particularly to FIG. 1, a block diagram of a relevant portion of a video apparatus 100 according to an exemplary embodiment of the present invention is shown. Video apparatus 100 of FIG. 1 comprises input/output (I/O) means such as I/O block 10, processing means such as processor 20, memory means such as memory 30, and display means such as display 40. Some of the foregoing elements of video apparatus 100 may be embodied using one or more integrated circuits (ICs). For clarity of description, certain conventional elements associated with video apparatus 100 such as certain control signals, power signals and/or other elements may not be shown in FIG. 1.

Video apparatus 100 of FIG. 1 may be embodied as any type of apparatus, device and/or system capable of enabling the display of video images. For example, video apparatus 100 may be embodied as a television set, computer and/or monitor that includes an integrated display device, or a set-top box (STB), video cassette recorder (VCR), digital versatile disk (DVD) player, video game box, personal video recorder (PVR), and/or computer that may not include an integrated display device. Accordingly, depending on the embodiment, display 40 may, or may not, be integrated with the other elements of FIG. 1.

I/O block 10 is operative to perform I/O functions of video apparatus 100. According to an exemplary embodiment, I/O block 10 is operative to receive signals such as audio, video and/or data signals in analog and/or digital format from one or more signal sources such as terrestrial, cable, satellite, Internet and/or other signal sources. I/O block 10 is also operative to output processed signals to one or more other devices, and to receive signals from such devices.

Processor 20 is operative to perform various signal processing and control functions of video apparatus 100. According to an exemplary embodiment, processor 20 processes the audio, video and/or data signals provided from I/O block 10 by performing functions including tuning, demodulation, forward error correction, and transport processing functions to thereby generate digital data representing audio, video and/or data content. Video data generated by processor 20 may be output for display via display 40.

Processor 20 is also operative to execute software code that enables the construction of composite video images according to principles of the present invention. Further details regarding processor 20 and the aforementioned aspect of the present invention will be provided later herein. Processor 20 is also operative to perform and/or enable other functions of video apparatus 100 including, but not limited to, receiving and processing user inputs, reading and writing data from and to memory 30, and/or other operations.

Memory 30 is operatively coupled to processor 20 and performs data storage functions of video apparatus 100. According to an exemplary embodiment, memory 30 stores data including, but not limited to, software code, source image file data, user input data, buffered image data, composite image file data, and/or other data as referenced herein. Memory 30 may be embodied as any type of data storage device.

Display 40 is operative to provide visual displays of video data under the control of processor 20. As indicated above, display 40 may or may not be integrated with the other elements of video apparatus 100. For example, if video apparatus 100 is embodied as an apparatus/device/system such as a television set, display 40 may be integrated with the other elements of FIG. 1. Conversely, if video apparatus 100 is embodied as an apparatus/device/system such as a set-top box (STB), display 40 may not be integrated with the other elements of FIG. 1.

Figure 2:
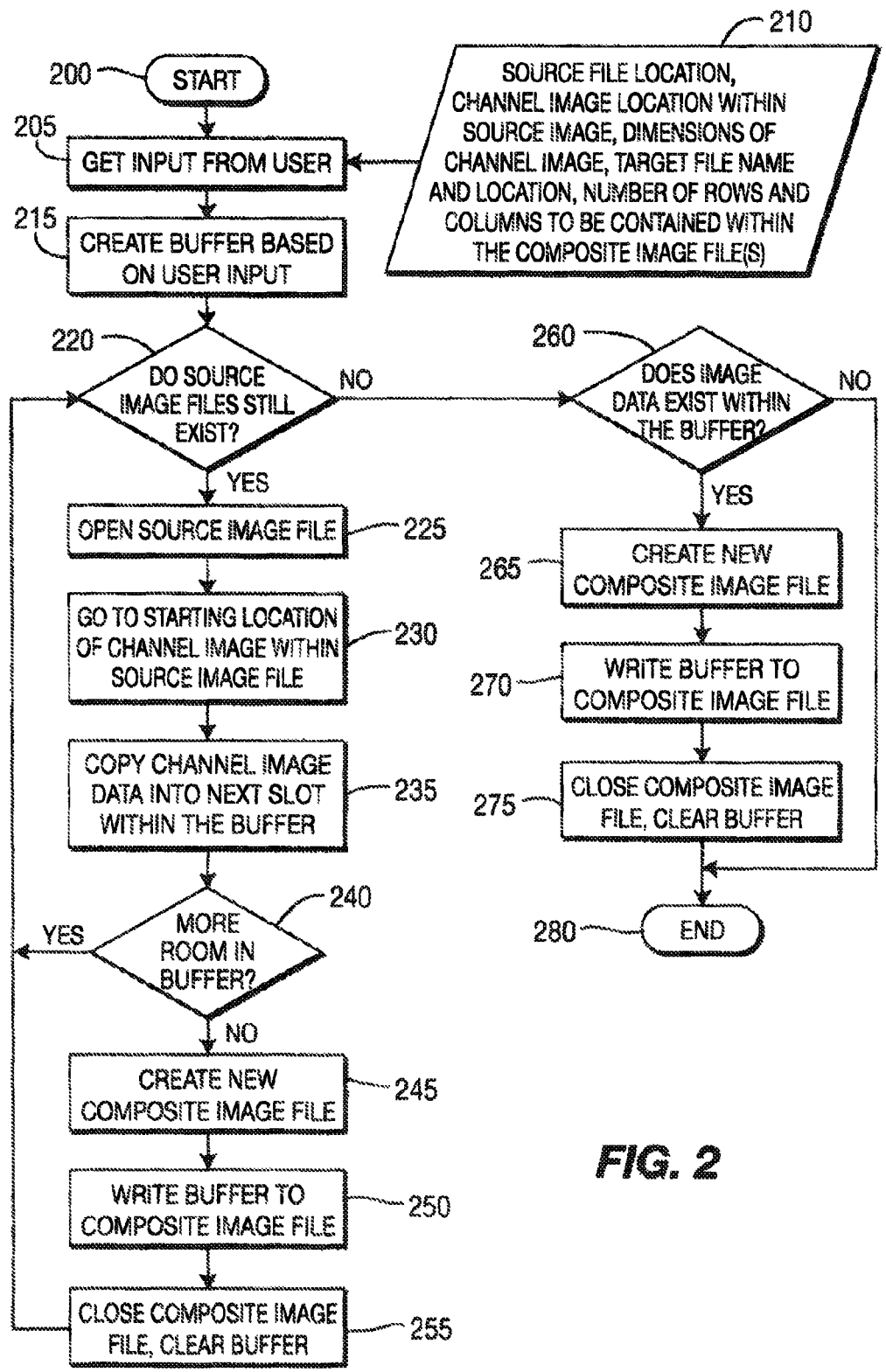
FIG. 2 is a flowchart illustrating steps for constructing one or more composite video images according to an exemplary embodiment of the present invention.

Referring now to FIG. 2, a flowchart 200 illustrating steps for constructing one or more composite video images according to an exemplary embodiment of the present invention is shown. For purposes of example and explanation, the steps of FIG. 2 relate to the construction of one or more composite video images to be used in evaluating displays of channel numbers/images. Also for purposes of example and explanation, the steps of FIG. 2 will be described with reference to video apparatus 100 of FIG. 1. The steps of FIG. 2 are exemplary only, and are not intended to limit the present invention in any manner.

At step 200, the method starts. At step 205, video apparatus 100 receives user inputs specifying information that is used to construct one or more composite video images according to principles of the present invention. According to an exemplary embodiment, the user inputs may be made via any type of suitable user input device (e.g., remote control, etc.), and such inputs are received at step 205 by processor 20. Also according to an exemplary embodiment, the user inputs of step 205 specify at least the following information (as shown in block 210): the location of source image files, the location of the channel number/image within each source image file (e.g., a starting or reference location), the dimension/size (e.g., in pixels) of each channel number/image, the name(s) of and location for storing resulting composite video image file(s) (i.e., target file name(s) and location), and the number of rows and columns to be included within each of the one or more composite video images. Many of these items of information may be specified in accordance with the user's discretion based on the particular test to be performed with the resultant composite video image(s). Further details regarding each of the items of information above will be provided later herein.

At step 215, a buffer is created based on the user inputs received at step 205. According to an exemplary embodiment, processor 20 creates the buffer at step 215 by allocating storage space within memory 30 in accordance with the number of rows and columns to be included within each of the one or more composite video images, as specified by the user at step 205. For example, in the case of 1000 channels (e.g., 000 through 999), the user will want to evaluate 1000 channel numbers/images. In such a case, the user may, for example, want to construct 5 composite video images, with each composite video image containing 200 channel numbers/images. Accordingly, the user may, for example, have specified 40 rows and 5 columns for each composite video image at step 205. In such a case, processor 20 creates the buffer in memory 30 at step 215 as a two-dimensional 40 row by 5 column array of cells (i.e., one cell for each channel number/image to be evaluated). The size of each one of these 200 cells is also governed by the user inputs of step 205. In particular, processor 20 uses the dimension/size information for the channel numbers/images specified by the user at step 205 to determine the dimension/size of each cell. For example, in the current example, the user may have specified that each of the channel numbers/images has a dimension/size of 20×80 pixels (i.e., 20 pixels high by 80 pixels wide). Accordingly, with the current example, each of the 200 cells in the buffer has a dimension/size of 20×80 pixels.

At step 220, a determination is made as to whether source image files still exist. According to an exemplary embodiment, processor 20 makes the determination at step 220 by examining the source image files whose location was specified at step 205. Such source image files may, for example, be stored in memory 30 and/or in another location. According to the aforementioned example where the user wants to evaluate 1000 channel numbers/images, there will be a total of 1000 source image files (each corresponding to a single channel number/image).

Assuming source image files still exist at step 220, process flow advances to step 225 where a next source image file is opened under the control of processor 20. During the first iteration of the method shown in FIG. 2, a first source image file (e.g., including the channel number/image "000") will be opened at step 225. Depending on design choice, the contents of the source image file may or may not be displayed via display 40 while it is open.

Figure 3:
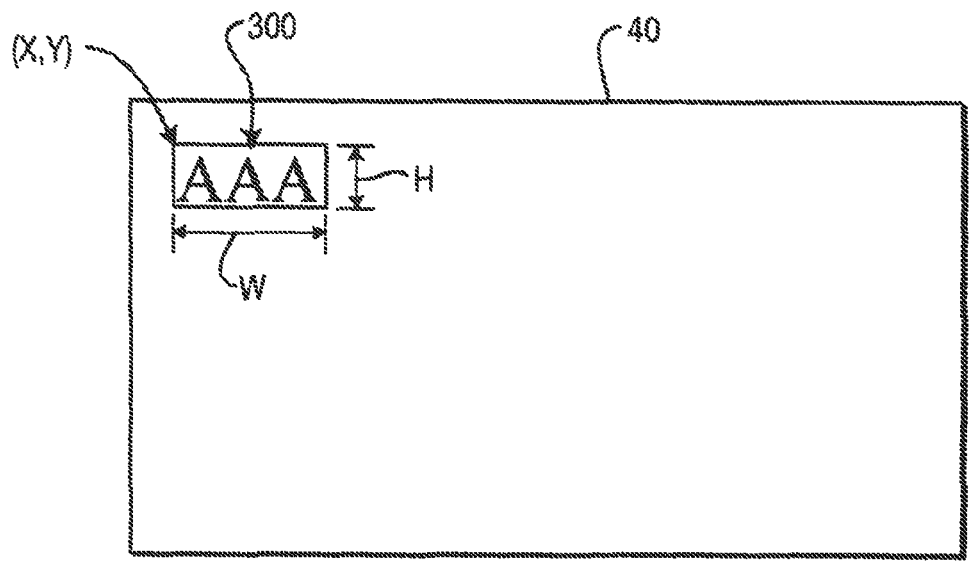
FIG. 3 is a diagram illustrating contents of a source image file according to an exemplary embodiment of the present invention.

At step 230, a starting or reference location of the channel number/image within the open source image file (as previously specified by the user at step 205) is identified by processor 20. For example, the user may have specified at step 205 a starting or reference location of (30, 69) which corresponds to the (X, Y) coordinates of an upper left corner (or other reference point) of the channel number/image within each source image file. An example of a source image file displayed via display 40 is shown in FIG. 3. As shown in FIG. 3, a given channel number/image portion 300 (shown for example as displaying "AAA") has a starting or reference location of (X, Y) in its upper left corner, and also has a dimension/size of "H" pixels in height and "W" pixels in width.

At step 235, data corresponding to the channel number/image within the current source image file is copied into a next cell (i.e., slot) of the buffer in memory 30 under the control of processor 20. According to an exemplary embodiment, a given column of the buffer is filled before proceeding to the next column. According to the example depicted in FIG. 3, data corresponding to channel number/image portion 300 (i.e., displaying "AAA") may be copied into the buffer in memory 30 under the control of processor 20 at step 235.

Next, at step 240, a determination is made as to whether additional room exists within the buffer in memory 30. According to an exemplary embodiment, processor 20 makes the determination at step 240 based on the number of source image files that have already been copied into the buffer in memory 30 and/or other information, such as information provided by the user at step 205.

If the determination at step 240 is positive, process flow loops back to step 220. Alternatively, if the determination at step 240 is negative, process flow advances to step 245 where a new composite video image file is created. According to an exemplary embodiment, processor 20 creates the new composite video image file in memory 30 at step 245 using the target file name specified by the user at step 205. At step 250, the data contents of the buffer in memory 30 are written to the composite video image file created at step 245. Next, at step 255, the composite video image file created at step 245 is closed, and the buffer in memory 30 is cleared under the control of processor 20.

From step 255, process flow loops back to step 220 where processor 20 makes a determination as to whether source image files still exist. If the determination at step 220 is negative, process flow advances to step 260 where processor 20 makes a determination as to whether image data still exists in the buffer in memory 30. If the determination at step 260 is negative, process flow advances to step 280 where the method ends. Alternatively, if the determination at step 260 is positive, process flow advances to step 265 where a new composite video image file is created. According to an exemplary embodiment, processor 20 creates the new composite video image file in memory 30 at step 265 using the target file name specified by the user at step 205. At step 270, the data contents of the buffer in memory 30 are written to the composite video image file created at step 265. Next, at step 275, the composite video image file created at step 265 is closed, and the buffer in memory 30 is cleared under the control of processor 20. The method ends at step 280, although certain steps of FIG. 2 (e.g., steps 215-280) may be repeated depending on the user's desired number of composite video image files.

Referring now to FIG. 4, an example of the contents of a composite video image file constructed according of the principles of the present invention is shown. The composite video image file of FIG. 4 is shown as being displayed via display 40, and includes the number of rows and columns specified by the user at step 205. In the example represented in FIG. 4 (and previously described herein), the composite video image file is arranged as an array that includes 40 rows represented by reference numbers 400-403, and 5 columns represented by reference numbers 410-414. Accordingly, the composite video image file of FIG. 4 includes 200 channel numbers/images (i.e., for channels 000 through 199) arranged in the manner as shown.

According to the aforementioned example where the user wants to evaluate 1000 channel numbers/images, the steps of FIG. 2 will be repeated so as to create 4 additional composite video image files (not shown in FIGS.). In this manner, FIG. 4 shows the first of the 5 total composite video image files, the second composite video image file will include channel numbers/images for channels 200 through 399, the third composite video image file will include channel numbers/images for channels 400 through 599, the fourth composite video image file will include channel numbers/images for channels 600 through 799, and the fifth composite video image file will include channel numbers/images for channels 800 through 999.

In practice, after generating the 5 composite video image files for the 1000 channel numbers/images, the user may employ various different types of testing techniques to evaluate the results. For example, the user may simply evaluate the 5 composite video image files manually to confirm that each of the 1000 channel numbers/images is properly displayed. In such a case, the evaluation of the 5 composite video image files is a significant improvement over the conventional technique of manually evaluating all 1000 source image files individually. Computer automated techniques for evaluating composite video image files may also be employed.

The principles of the present invention may also be used to create composite video images for testing various different types of display items other than channel numbers. Moreover, the number of resulting composite video images may be designated by the user based on his/her inputs at step 205. For example, the user may want to evaluate the display of 1000 channel logos. In such a case, the user may, for example, specify each channel logo to be located at (4, 4), and to have a dimension/size of 80×80 pixels, at step 205. The user may also, for example, want each composite video image to contain 50 channel logos. Therefore, the user may also specify at step 205 that each composite video image will have 5 rows and 10 columns (i.e., 50 cells per composite video image, each cell containing a single channel logo). After specifying this and other information at step 205, the steps of FIG. 2 may be repeatedly performed as described above to generate 20 composite video image files, with each composite video image file containing 50 channel logos, as desired.

As another example, the user may want to evaluate IR reception feedback and thereby confirm that each of 256 channels is providing a proper video output. In such a case, the user may, for example, specify a display portion likely to have detectable video content located at (104, 204), and having a dimension/size of 640×480 pixels, at step 205. The user may also, for example, want only a single composite video image for evaluation. Therefore, the user may also specify at step 205 that the resulting composite video image will have 32 rows and 8 columns (i.e., 256 cells with each cell containing a video portion from a given channel). After specifying this and other information at step 205, the steps of FIG. 2 may be repeatedly performed as described above to generate the single composite video image file, as desired. Other types of video apparatus testing may also be performed using the principles of the present invention described herein.

It is noted that the size of the selected portion from a source image may differ from that from another source image. In this case, the largest among the selected portions may be selected as the size of each cell in a composite image for easy implementation. An alternative is to arrange selected portions having the same size in a row, as shown in FIG. 5. As a result, the number of selected portions in a row in a composite image may differ from that from another row. In this scenario, it is possible that more than one row is needed for selected portions having the same size.

Although as illustrated the location of the selected portion from each source image is the same, the location of the selected portion from a source image may differ from that from another source image. Furthermore, the image content of the selected portion from a source image may differ from that from another source image. Furthermore, although the selected portion from a source image is illustrated as smaller than the source image, the selected portion can be the whole image but subsampled to reduce the size. For example, a user can specify taking one sample out of N samples, so that the size of the image is reduced to 1/N of the original size. The subsampling can be used in a selected portion that is smaller than the size of the source image as well.

As described herein, the present invention provides a method that advantageously renders video apparatus testing more efficient by consolidating important information from many video images into one or more composite video images. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method comprising:
receiving, by a video apparatus, location information for portions of a plurality of video images, each of said video images being stored as an image file, said portions having different sizes;
placing, by said video apparatus, said portions of said plurality of video images into different rows of a combined video image for display according to said sizes of said portions; and
receiving row and column information for said combined video image, wherein
said combined video image comprises a plurality of rows and columns in accordance with said row and column information;
said plurality of rows and columns form a plurality of cells;
said portion of a first one of said plurality of video images is placed in a first one of said cells;
said portion of a second one of said plurality of video images is placed in a second one of said cells;
said portion of said first video image includes first channel information; and
said portion of said second video image includes second channel information.

2. The method of claim 1, further comprising a step of receiving size information for said portions of said plurality of video images.

3. The method of claim 2, wherein said size information is expressed in pixel dimensions.

4. The method of claim 1, further comprising steps of:
receiving a file name for said combined video image; and
storing said combined video image as a file under said file name.

5. A video apparatus, comprising:
a processor operative to receive location information for portions of a plurality of video images, each of said video images being stored as an image file, said portions having different sizes and to combine said portions of said plurality of video images into a combined video image for display according to said sizes of said portions; and
a memory operative to store said combined video image, wherein
said processor further receives row and column information for said combined video image
said combined video image comprises a plurality of rows and columns in accordance with said row and column information;
said plurality of rows and columns form a plurality of cells;
said portion of a first one of said plurality of video images is placed in a first one of said cells,
said portion of a second one of said plurality of video images is placed in a second one of said cells; and
said portion of said first video image includes first channel information; and
said portion of said second video image includes second channel information.

6. The video apparatus of claim 5, wherein said processor further receives size information for said portions of said plurality of video images.

7. The video apparatus of claim 6, wherein said size information is expressed in pixel dimensions.

8. The video apparatus of claim 5, wherein:
said processor further receives a file name for said combined video image; and
said memory stores said combined video image as a file under said file name.

* * * * *